United States Patent [19]

Dolan et al.

[11] Patent Number: 5,555,509

[45] Date of Patent: Sep. 10, 1996

[54] SYSTEM FOR RECEIVING HVAC CONTROL INFORMATION

[75] Inventors: Robert P. Dolan, Syracuse; Thomas L. DeWolf, Liverpool; Thomas R. Phillips, Cicero, all of N.Y.; Michael J. Zirngibl, Neustadt/Donau; Josef J. Schon, Landershofen, both of Germany

[73] Assignees: Carrier Corporation, Syracuse, N.Y.; TEMIC Telefunken Microelectronic GmbH, Heilbronn, Germany

[21] Appl. No.: 587,169

[22] Filed: Jan. 16, 1996

Related U.S. Application Data

[63] Continuation of Ser. No. 31,509, Mar. 15, 1993, abandoned.

[51] Int. Cl.⁶ .................................................. G06F 17/50
[52] U.S. Cl. ............................................. 364/505; 236/51
[58] Field of Search ............................... 364/130–132, 364/143, 505, 707, 948.4–948.91, 273–273.5; 323/723; 236/1 C, 46 R, 46 F, 91 D, DIG. 8, DIG. 14, 51; 395/750; 165/22

[56] References Cited

U.S. PATENT DOCUMENTS

| | | | |
|---|---|---|---|
| 4,308,911 | 1/1982 | Mandl | 165/22 |
| 4,333,316 | 6/1982 | Stamp, Jr. et al. | 62/126 |
| 4,393,662 | 7/1983 | Dirth | 62/115 |
| 4,453,590 | 6/1984 | Holliday et al. | 236/46 R |
| 4,509,585 | 4/1985 | Carng et al. | 236/46 R |
| 4,526,010 | 7/1985 | Sato et al. | 62/126 |
| 4,535,333 | 8/1985 | Twardowski | 340/825.69 |
| 4,602,343 | 7/1986 | Dougherty | 364/505 |
| 4,722,475 | 2/1988 | Newell, III et al. | 236/46 R |
| 4,734,871 | 3/1988 | Tsunoda et al. | 236/46 F |
| 4,749,881 | 6/1988 | Uhrich | 236/46 R |
| 4,879,879 | 11/1989 | Marsala et al. | 62/202 |
| 4,901,917 | 2/1990 | Littell, III | 236/46 R |
| 4,922,224 | 5/1990 | Drori et al. | 340/428 |
| 4,969,508 | 11/1990 | Tate et al. | 165/22 |
| 5,034,884 | 7/1991 | Matsuoko et al. | 364/200 |
| 5,103,391 | 4/1992 | Barrett | 364/133 |
| 5,104,037 | 4/1992 | Karg et al. | 236/46 R |
| 5,109,222 | 4/1992 | Welty | 340/825.72 |
| 5,117,900 | 6/1992 | Cox | 165/53 |
| 5,128,855 | 7/1992 | Hilber et al. | 364/132 |

(List continued on next page.)

FOREIGN PATENT DOCUMENTS

| | | |
|---|---|---|
| 055560 | 7/1982 | European Pat. Off. . |
| 387191 | 4/1995 | European Pat. Off. . |
| 2099607 | 12/1982 | United Kingdom . |
| 2147477 | 5/1985 | United Kingdom . |
| 2189333 | 10/1987 | United Kingdom . |
| 2197514 | 5/1988 | United Kingdom . |
| 8400624 | 2/1984 | WIPO . |

OTHER PUBLICATIONS

Patent Abstract of Japan, JP–A–62029,856, (Toshiba Corp.), Jul. 1987.

McGlynn., Daniel R—"Microprocessors–Technology, Architecture and Applications" ©1976 Wiley & Sons pp. 15–16, 102–113.

Motorola Semiconductor Products, Inc. "M6800 Microprocessor Application Manual", 1975, pp. 5–57 through 5–67.

Fink, Donald G. "Electronics Engineer's Handbook" 1975, pp. 14–28 Through 14–30.

Rudolf F. Graf, "Modern Dictionary of Electronics", 1977, pp. 116, 250, 288–289.

John B. Peatman, "Microcomputer Based Design", 1977, pp. 288–299.

Zilog, Inc. "Zilog Microcontrollers", 1991, pp. 21, 35, 1276–1289.

*Primary Examiner*—Emanuel T. Voeltz
*Assistant Examiner*—Craig Steven Miller

[57] ABSTRACT

A device for reading and transmitting control parameter selections to a control system for an HVAC system is disclosed. The device is activated by the control system which receives the encoded control parameter selections. The activation is preferably accomplished by switching a power supply on and off that is associated with the reading and transmitting device.

13 Claims, 5 Drawing Sheets

U.S. PATENT DOCUMENTS

| | | | |
|---|---|---|---|
| 5,135,045 | 8/1992 | Moon | 165/2 |
| 5,151,789 | 9/1992 | Young | 348/734 |
| 5,155,469 | 10/1992 | Hartmann et al. | 340/429 |
| 5,189,412 | 2/1993 | Mehta et al. | 340/825.22 |
| 5,203,497 | 4/1993 | Ratz et al. | 236/46 R |
| 5,227,981 | 7/1993 | Katsuki et al. | 364/505 |
| 5,363,904 | 11/1994 | Pierret et al. | 165/2 |
| 5,385,297 | 1/1995 | Rein et al. | 236/49.3 |

SYSTEM FOR RECEIVING HVAC CONTROL INFORMATION

This application is a Continuation of application Ser. No. 08/031,509 filed Mar. 15, 1993, now abandoned.

BACKGROUND OF THE INVENTION

This invention relates to the processing of control information for use by a control system for controlling a heating, venting and air conditioning system.

It has heretofore been known to receive control information from a control source and thereafter process this information through for use by a control system for a heating, venting, and air conditioning system. The control source could be a control panel or a remote control device. The control source may have had any number of different control parameters entered by a user at any point in time. These entered control parameters need to be transmitted to the control system in an efficient and expeditious manner.

OBJECTS OF THE INVENTION

It is an object of the invention to provide a processing system which transmits any user entered control parameters in an efficient and expeditious fashion to the control system of a heating, venting and air conditioning system.

SUMMARY OF THE INVENTION

The above and other objects are achieved by providing a device which reads and encodes all control parameter selections in a predefined manner in response to the control system. The device comprises a programmed microprocessor that always begins its reading of control parameter selections from a beginning point in a software program regardless of which or how many control parameters may have been entered at any point in time. The microprocessor includes a switchable power supply associated therewith which is switched on and off periodically by the control system that will be receiving and responding to the control parameter selections. The switching of the power supply on and off causes the microprocessor to always begin at the same initial address defining the beginning of the program for encoding control parameter selections.

The control system includes a programmed microprocessor which contains a program that switches the power supply associated with the microprocessor on and off. This program delays the switching of the power supply on again for a quiet period following the previous receipt of control parameter selections.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
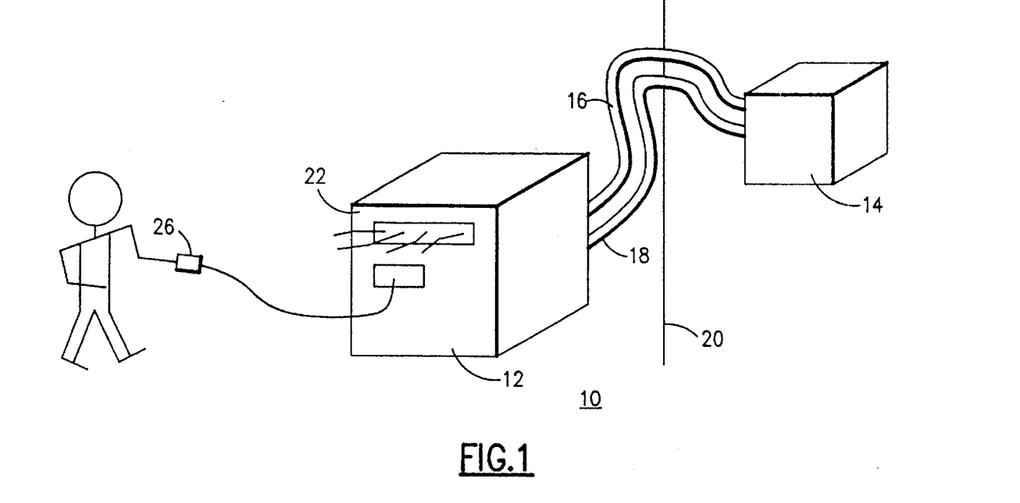
FIG. 1 illustrates a heating or air conditioning system having the capability of receiving signals from a hand held remote control device.

Referring to FIG. 1, a split duct free heating or air conditioning system 10 is seen to include an indoor unit 12 and an outdoor unit 14 connected by refrigerant lines 16 and 18 that pass through a building wall 20. This split system is commonly found in areas where interior building space is at a premium allowing only for a small indoor unit. The indoor unit normally includes a blower unit which blows the heated or cooled air out of an opening 22. The controls for the system are also preferably housed within the indoor unit. The controls may include the ability to select certain control parameters such as operating mode (auto mode, cooling mode, dry mode, heating mode), "fan speed selection", "on/off selection". These control parameters may be selectively chosen and activated by a hand held remote control device 26 that is hard wired to the indoor unit 12.

Figure 2:
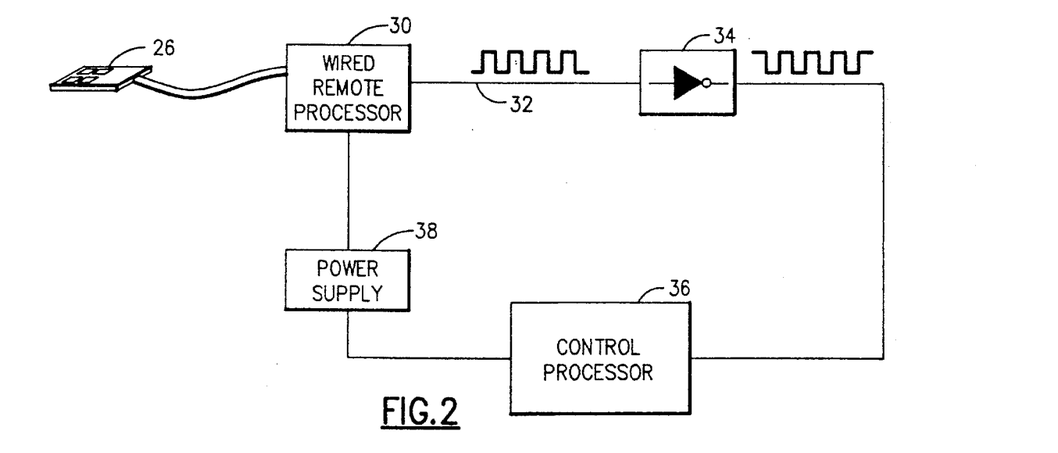
FIG. 2 illustrates a system for receiving and processing signals from the hand held remote control device of FIG. 1.

Referring to FIG. 2, the system for receiving and processing the signals from the hard wired remote control device 26 is illustrated. The system includes a microprocessor 30 which receives a plurality of individual inputs corresponding to selections that may be made on the hard wired remote control device 26. As will be explained in detail hereinafter, the microprocessor 30 reads the control parameter selections and generates a bit stream signal over a line 32. The bit stream signal is inverted by an inverter 34 so as to define a logic level signal appropriate for a main control microprocessor 36. The main control microprocessor 36 receives the logic level signal at its interrupt input thereby causing the microprocessor to be interrupted from its main program control. The main control microprocessor proceeds to process the logic level signal and determine the binary value of each bit in the bit stream. The binary values of each bit are stored as bytes of information which are checked for validity and accuracy as will be explained in detail hereinafter. Following this successful processing, the communicated information will be used to immediately update the control parameter information used by the main control program residing within the main control microprocessor 36. In accordance with the invention, the microprocessor 36 will also periodically switch a power supply 38 on and off thereby activating and deactivating the microprocessor 30. The periodic activation of the microprocessor 30 causes the execution of an encoding program which will now be described.

Figure 3:
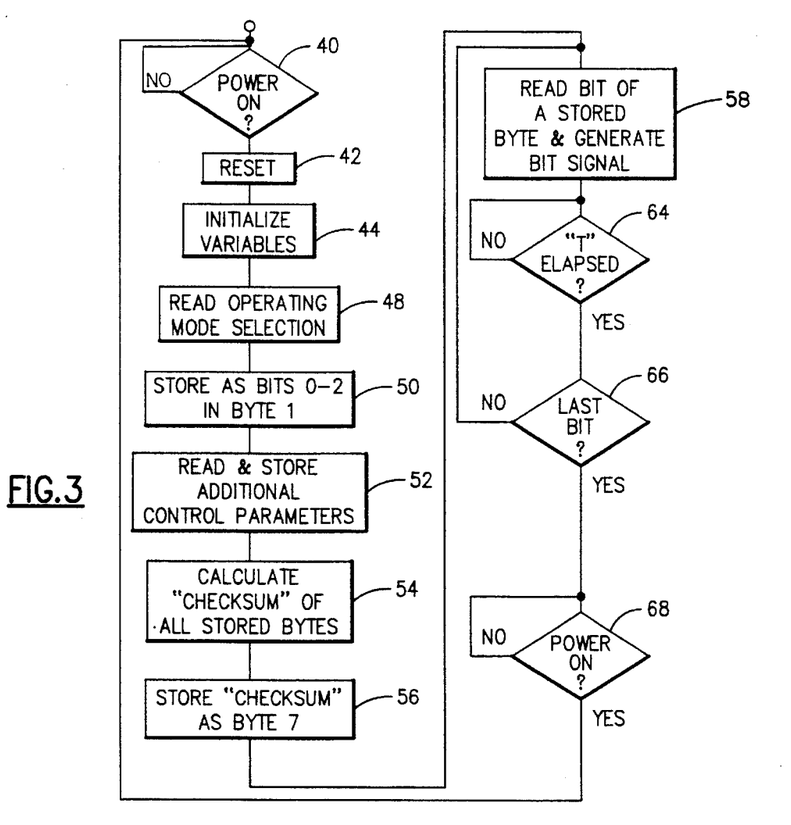
FIG. 3 illustrates certain software residing in a wired remote microprocessor within the system of FIG. 2 which processes the signal from the hand held remote control device of FIG. 1.
Figure 4:
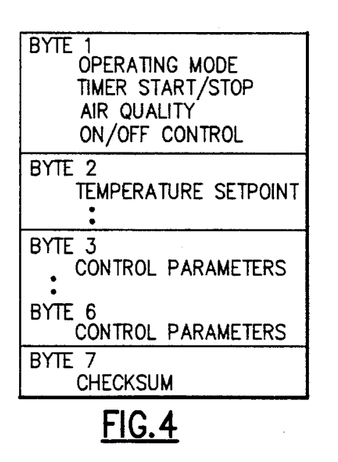
FIG. 4 illustrates the data format achieved by the software of FIG. 3.

Referring to FIG. 3, the encoding program resident in the microprocessor 30 is illustrated in detail. The program begins with a step 40 wherein a "power on" activation is awaited from the power supply 38. At such time as "power on" occurs, the microprocessor proceeds to perform a "power on" reset in a step 42. This requires the microprocessor 30 to begin at a certain initial address each time that the power is turned on. The program at this address begins with a step 44 wherein all program variables are initialized. This would include initializing a number of data fields that will be used to store bytes of information to be defined by the program. Referring to FIG. 4, a description of some of the bytes of information is shown. In this regard, seven separate byte fields of information are to be defined. The first is an information byte "one" and the last is to be a check sum byte equal to the binary value of the bits constituting bytes one through six. Byte one includes the information bits associated with the control parameters relating to "operating mode", "timer start/stop", "air quality" and "on/off" control that have been transmitted from the hard wired remote control 26. It is to be appreciated that the data bytes in FIG. 4 can be defined to include any amount of information transmitted that may be necessary to control the heating or air conditioning system 10. Referring again to FIG. 3, the microprocessor 30 proceeds to a step 48 and reads the operating mode selection from the hard wire remote control 26. It will be remembered that the operating mode may be any of a number of different possibilities including automatic mode, cooling mode, dry mode, heating mode, and fan. Which ever mode is selected, it is included and stored as bits zero through two in byte one. This is accomplished in step 50. In successive fashion, the microprocessor reads and stores other control parameter information so as to define the bytes of information in FIG. 4. This is symbolically denoted as step 52. The microprocessor will proceed in a step 54 to calculate the binary value of all defined bytes of information. This value is stored as byte seven in a step 56. The microprocessor will now proceed in a step 58 to successively read each bit of stored bytes one–seven and generate bit signals depending on whether the read bit is either a binary zero or a binary one.

Figure 5:
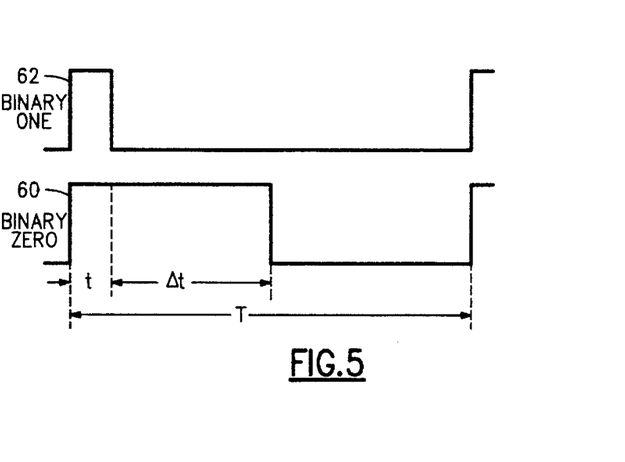
FIG. 5 illustrates the manner in which data is transmitted by the software of FIG. 3.

Referring to FIG. 5, the bit signal generation routines for a binary one and a binary zero are illustrated. The bit signal generation for both binary values begins with a transition such as 60 or 62 from zero volts to five volts which lasts for a predefined period of time denoted as "t". This predefined period of time "t" should be selected such that the leading edges 60 or 62 are sufficiently defined for a microprocessor to clearly detect and react thereto. In the event that a binary one is to be transmitted, the generated signal subsequently drops logically low to zero volts. In the event that a binary zero is to be transmitted, the generated signal maintains the logically high voltage level of plus five volts for an additional $\Delta t$ period. The $\Delta t$ period should allow the signal level to be sampled five times as will be discussed hereinafter. The signal thereafter drops to zero volts. The signal generating routines moreover assure that another bit signal generation will not occur until a time "T" has elapsed since the beginning of the signal transition denoted by either leading edge 60 or 62. This is step 64 in FIG. 3. The bit generation routine will continue to successively read bits from the stored bytes and generate a binary one or a binary zero signal during every time "T" until the last bit of the checksum byte has been sent as detected in step 66. At this time, the microprocessor 30 will proceed to a step 68 and inquire as to whether the power remains on from the power supply 38. It will be remembered that the power supply 38 is switched off so as to define the time between successive bit streams of information. This will be discussed more fully hereinafter. When the power supply has been turned off, the microprocessor 30 proceeds to step 40 and again inquires as to whether the power has been turned on again. At such time as the power has been turned on, the microprocessor 30 will proceed to execute a "power on" reset and again prepare to read and store the information and thereafter generate another bit stream.

It will be remembered that the transmitted bit stream from the microprocessor 30 is inverted and applied to the main control microprocessor 36. The program within the main control processor 36 which processes this bit information will now be described.

Figures 6, 6A:
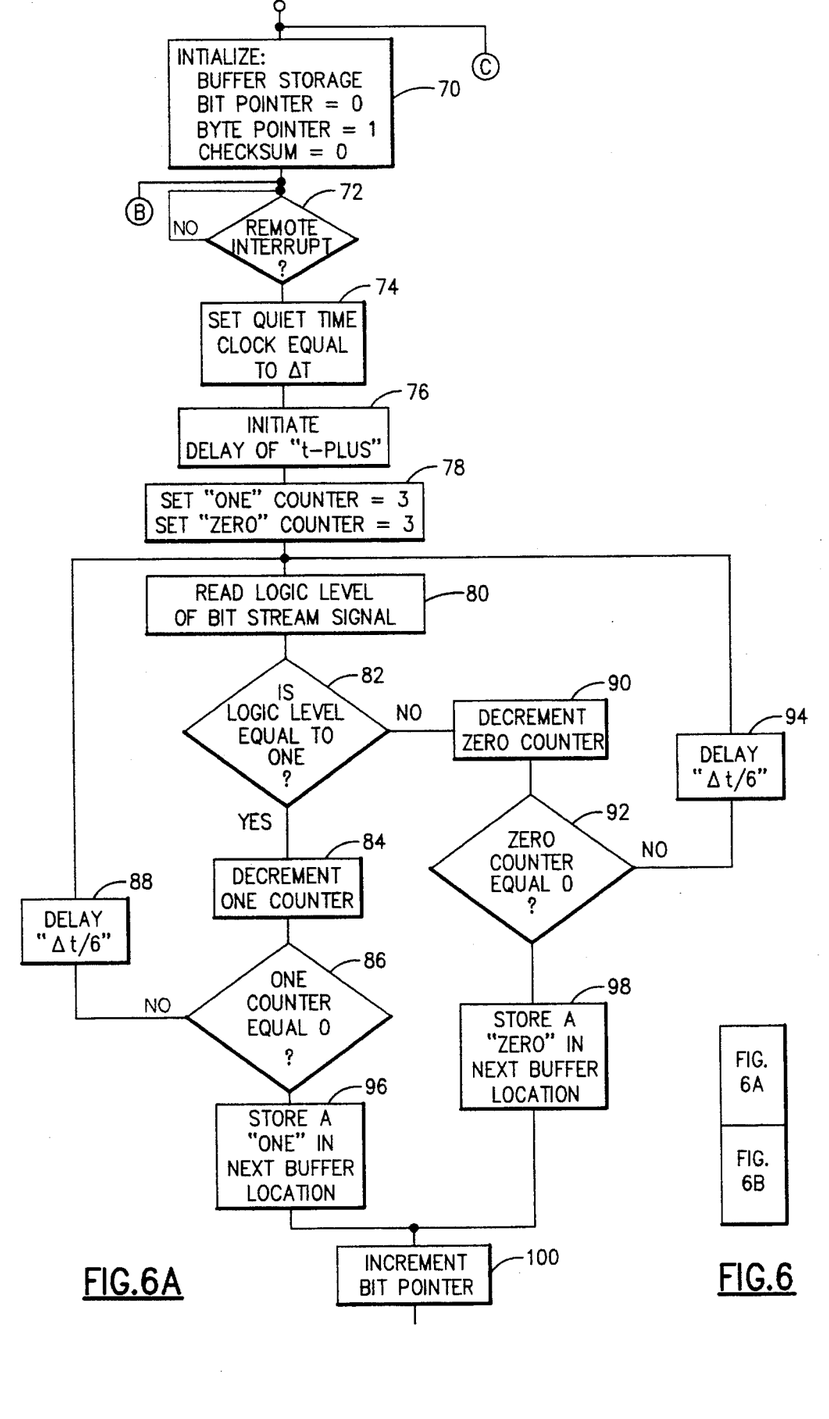
FIG. 6 illustrates the relationship between the flowcharts of FIGS. 6a and 6b.
FIGS. 6A and 6B illustrate certain software residing in the main control microprocessor of the system in FIG. 2 which processes the formatted data.

Referring to FIG. 6A, the program which receives and processes the inverted bit stream signal begins with a step 70 wherein the program variables to be used are initialized. This includes clearing a buffer storage area and setting a bit pointer and a "checksum" equal to zero. The byte pointer is set equal to one. The program proceeds to a step 72 and awaits a remote interrupt in the bit stream signal being applied to the main control microprocessor 36. It will be remembered that each bit in a bit stream signal is marked by a transition in the signal level that defines a leading edge in the bit signal. It is this logic level change in each bit signal which will be sensed as a remote interrupt in the step 72. When this occurs, the microprocessor 36 immediately proceeds to reset a "quiet time" clock in step 74. The quiet time clock defines a period of time, $\Delta T$, between successive bit streams and is constantly reset in step 74 so as to ultimately define the amount of time between the last bit to be transmitted in a given bit stream and the next bit stream to be generated thereafter. The microprocessor proceeds from step 74 to initiate a delay slightly greater than "t" in step 76 before setting a binary one counter and a binary zero counter equal to three in step 78. The microprocessor will proceed after the delay of step 74 to read the logic level of the bit stream signal being applied to the main control microprocessor 36. Referring to FIG. 5, it is to be noted that after an initial "t" period, the logic level of the signal will indicate either a binary one or a binary zero. It is this portion of the bit signal that is to be sampled in step 80. The microprocessor will proceed to a step 82 and inquire as to whether the sensed logic level of step 80 is equal to a binary one. It will be remembered that the logic level for a binary one signal condition at the input of the microprocessor is a plus five volts due to the inversion of the encoded binary one signal of FIG. 5. In the event that the logic level indicates a binary one, the microprocessor 36 proceeds to a step 84 and decrements the one counter and thereafter proceeds to inquire as to whether the one counter equals zero in step 86. In the event that the one counter has not been decremented to zero, the microprocessor proceeds to implement a delay of "$\Delta t/6$" in a step 88 and again reads the logic level of the bit stream signal applied to the microprocessor in step 80. The logic level should again be equal to a one thereby causing the counter to again be decremented in a step 84.

Referring to step 80, in the event that a logic level is not equal to binary one, the microprocessor proceeds to a step 90 and decrements the zero counter. The microprocessor will proceed in a step 92 to inquire as to whether the zero counter is equal to zero. In the event that it is not, the microprocessor will proceed to delay for a period of "$\Delta t/6$" in a step 94 before again reading the logic level of the bit stream signal in step 80. The sensing of the logic level of the bit signal and thereafter determining whether it is a binary one or a binary zero will continue to occur until either the one counter or the zero counter has been decremented to zero. When this occurs, the microprocessor will exit from either step 86 or step 92 to respective steps 96 and 98. The thus determined binary value will be stored in the next open buffer location that has been provided for in the buffer storage in either step 96 or 98. The microprocessor will proceed to a step 100 and increment the bit pointer. The bit pointer will next be examined in a step 102 for being equal to seven. In the event that it is not, the microprocessor will return to step 72 and look for the next interrupt indicating that the next bit signal is to be processed. Referring again to steps 100 and 102, it is to be appreciated that when the bit pointer has been successively incremented to a value of seven, a complete byte of information will have been read and stored within the buffer storage. This complete byte of information is stored as a numbered byte of received information corresponding to the current byte pointer value in a step 103. At this point in time, the microprocessor will proceed to a step 104 and inquire as to whether the byte pointer is equal to seven. It will be remembered that the number seven represents the total number of bytes to be communicated. In the event that the last byte has not been read the microprocessor will proceed to a step 106 and increment the byte pointer before resetting the bit pointer equal to zero in step 108 and returning to step 72. Referring to step 72, it is to be noted that the process will again begin of reading bits until eight successive bits have been read and so noted as a byte of information. This will prompt the microprocessor to again increment the byte pointer and inquire as to whether the last byte has been read in step 104.

Figure 6B:
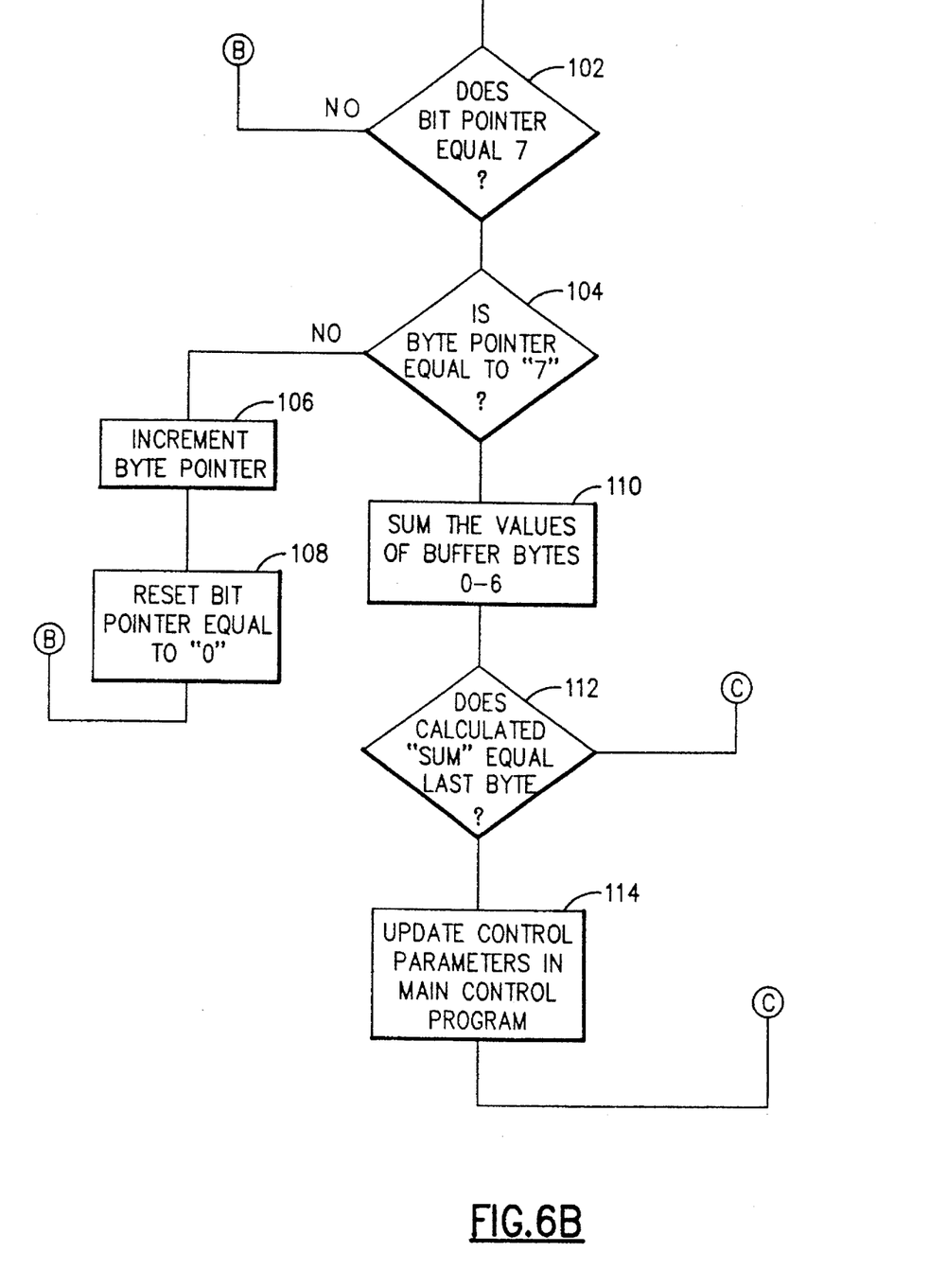

When the byte pointer equals seven, all bytes will have been read into the control microprocessor 36. At this point, the microprocessor 36 will proceed to a step 110 and sum the values of buffer bytes one–six. The thus calculated sum is compared with the "checksum" byte which is the last byte of information received. This is accomplished in step 112. It is to be appreciated that a "checksum" comparison in step 112 will assure that the bytes of information were communicated accurately. In the event that this "checksum" calculation does not indicate an accurate communication, the microprocessor will proceed to exit from the step 112 to the beginning of the program and initialize variables in step 70. The microprocessor will otherwise proceed to a step 114 wherein the bytes of information stored in the buffer will be used to update the control parameters in the control program. In this manner, the control program will be able to respond to any changes in the control parameters that have been recently communicated from the remote control device 26. Following the updating of the control parameters, the microprocessor will exit step 114 and return to the step 70 wherein the program variables are again initialized before awaiting the next remote interrupt in a step 72 indicating another bit stream of information is to be processed.

Figure 7:
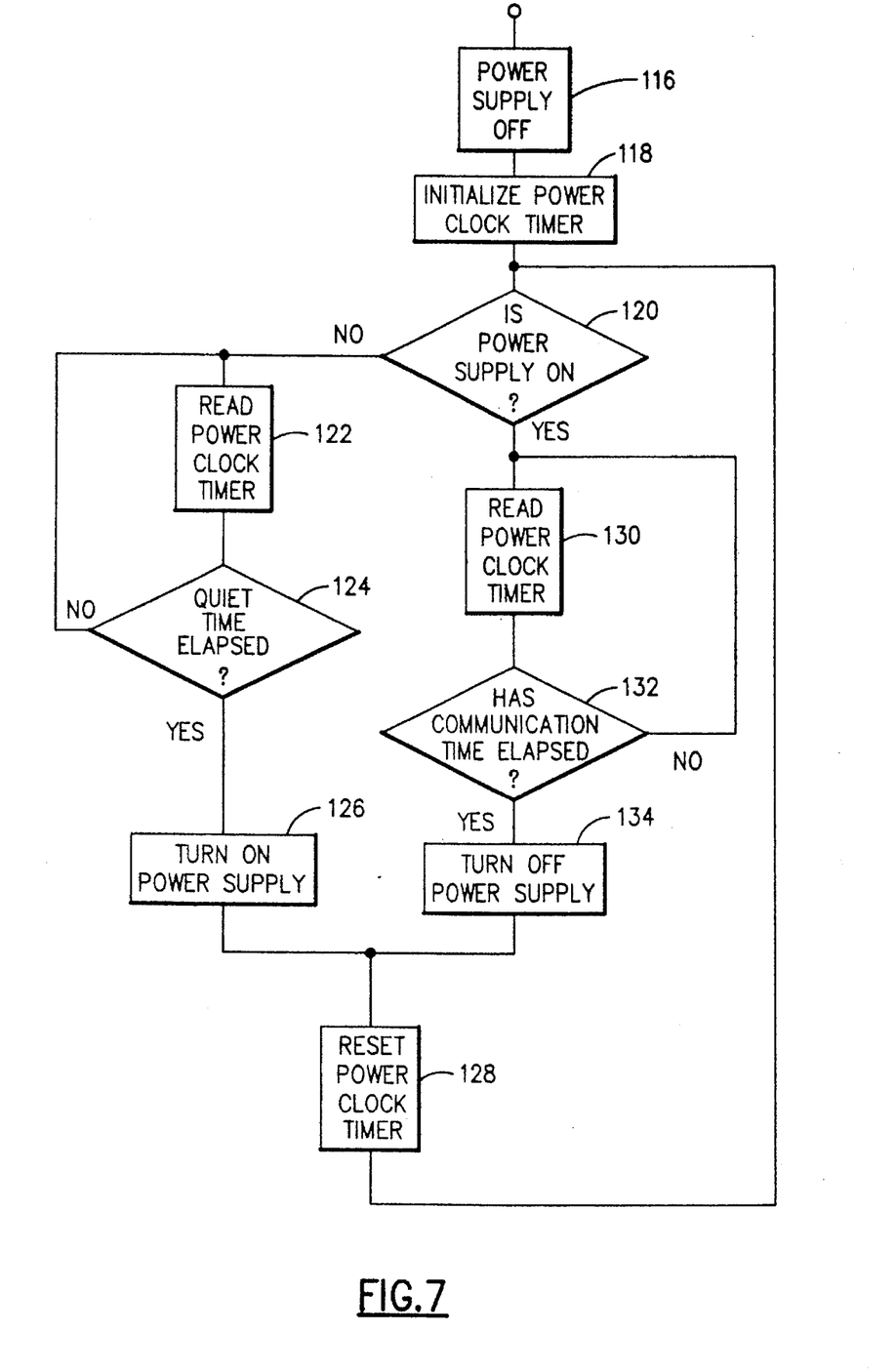
FIG. 7 illustrates certain power supply switching software residing in the main control microprocessor of the system in FIG. 2 which effectively controls the active time of the wired remote microprocessor of FIG. 2.

Referring now to FIG. 7, the software program resident within the main control microprocessor 36 which turns the power supply 38 on and off is illustrated. This program begins with a step 116 which initially assures that the power supply 38 is in an off condition. The program proceeds to a step 118 and sets a power clock timer equal to zero. The power clock timer begins counting at this point in time. The microprocessor proceeds to a step 120 and inquires as to whether the power supply is on. Since the power supply will initially not be turned on, the microprocessor proceeds to a step 122 and reads the power clock timer. The thus read power clock timer is compared in a step 124 with the quiet time between bit stream transmissions. It will be remembered that this quiet time is set equal to ΔT in step 74. The microprocessor essentially loops around steps 122 and 124 until such time as the quiet time has elapsed. At this point the microprocessor proceeds to a step 126 and turns on the power supply. The power clock timer is immediately reset in a step 128 and the microprocessor proceeds back to step 120 to inquire as to whether the power supply is on. Since the power supply has been turned on, the microprocessor will proceed to a step 130 and read the power clock timer. The thus read time will be compared with the allowed time for the complete communication of a set of data bytes in a step 132. It is to be appreciated that this time is determined by the particular microprocessor configuration used and the time required to read the set of particular bytes that is to be transmitted. The microprocessor will loop back through steps 128 and 140 until the communication time has elapsed. At this point, the microprocessor will proceed to a step 134 and turn off the power supply. This will deactivate the microprocessor 30. The main control microprocessor 36 will return to step 116 and again inquire as to whether the power supply is on. Since the power supply has now been turned off, the microprocessor will proceed to steps 122 and 124 and again await the elapse of quiet time which occurs between successive transmissions of the data bytes. In this manner, the power switching software of FIG. 7 effectively dictates a time during which the microprocessor can transmit data bytes and when it cannot. As has been heretofore explained, when the power supply is turned on, the power reset occurs within the microprocessor 30 thus allowing it to execute the software of FIGS. 3A through 3C. In this manner, the microprocessor 30 effectively generates the data bytes based on the control parameter selections that have been made by the person holding the hard wired remote control device 26. The bit stream of information generated on the line 32 is inverted and subsequently applied to the main control processor 36.

It is to be appreciated that a particular embodiment of the invention has been described. Alterations, modifications and improvements thereto will readily occur to those skilled in the art. Such alterations, modifications and improvements are intended to be part of this disclosure even though not expressly stated herein and are intended to be within the scope of the invention. Accordingly the forgoing description is by way of example only. The invention is limited only as defined in the following claims and the equivalents thereto.

What is claimed is:

1. A system for receiving and processing control information to be used for controlling a heating or air conditioning system, said system comprising:

a programmed processor for reading control information and arranging the control information in a predefined format;

a control processor for receiving the control information in the predefined format;

a power supply associated with said programmed processor for providing power to said programmed processor; said power supply being switched on in response to a signal from said control processor when said programmed processor is to receive control information;

means for transmitting the arranged control information in the predefined format to the control processor for use in controlling the heating or air conditioning system;

means within said control processor for reading the control information in the predefined format; and means within said control processor for switching said power supply off after reading the control information in the predefined format.

2. The system of claim 1 further comprising:

means within said control processor for switching said power supply on after a predetermined period of time has elapsed following the power supply being switched off.

3. A system for receiving and processing communicated control information used to control a heating or air conditioning system, said system comprising:

a first processor for reading and arranging the communicated control information in a predefined format;

a second processor connected to said first processor so as to receive the control information from the first processor in the predefined format; and a power supply associated with said first processor, said power supply being switched off by a signal from said second processor when the control information has been received by said second processor.

4. The system of claim 3 wherein said second processor includes:

means for reading the control information in the predefined format from said first processor; and means for switching said power supply associated with said first processor off after reading the control information.

5. The system of claim 4 wherein said second processor furthermore includes:

means for switching said power supply associated with said first processor on after a period of time has elapsed following the power supply being switched off.

6. The system of claim 4 wherein said second processor furthermore includes:

means for defining a period of time during which the control information in the predefined format may be read; and means for switching said power supply off after the predefined period for reading the control information in the predefined format has elapsed.

7. The system of claim 6 wherein said second processor furthermore includes:

means for switching said power supply associated with said first processor on after a second predefined period of time has elapsed following the power supply being switched off.

8. The process of claim 7 further comprising the step of:

means for switching the electrical power to the first processor on so as to trigger the transmission of control information in the predefined format following receipt and arrangement of the control information by the first processor.

9. A process for receiving and handling control information used to control a heating or air conditioning system, said process comprising the steps of:

receiving control information in a first processor;

arranging the control information in a predefined format in the first processor;

transmitting the control information in the predefined format to a second processor used to control the heating or air conditioning system; and causing the second processor to switch the electrical power to the first processor off when the control information in the predefined format has been received by the second processor.

10. The process of claim 9 wherein said step of causing the second processor to switch the electrical power to the first processor off when the control information in the predefined format has been received comprises the steps of:

reading the control information in the predefined format from the first processor within a predetermined period of time; and switching the electrical power to the first processor off after the predetermined period of time has elapsed.

11. The process of claim 10 further comprising the step off causing the second processor to switch the electrical power to the first processor on so as to trigger the transmission of the control information in the predefined format following receipt and arrangement of the control information by the first processor.

12. A system for receiving and transmitting control information from a first processor to a second processor wherein the first processor receives control parameter selections and transmits the selections to a second processor which is part of a control system for controlling a heating or air conditioning system, said system further comprising:

a power supply associated with said first processor;

means within said second processor for switching said power supply associated with said first processor on when the control system is to receive control information;

means within said first processor, responsive to the power supply associated therewith, reading and transmitting the control information; and means within said second processor for switching said power supply off after a predetermined period of time has elapsed for receiving the control information from said first processor.

13. The system of claim 12 wherein said means within said second processor for switching said power supply associated with said programmed processor on comprises:

means for defining a period of time between successful transmissions of control information; and means for switching said power supply on when the period of time between successful transmissions has elapsed.

* * * * *